(12) United States Patent
Wilds

(10) Patent No.: US 7,380,857 B2
(45) Date of Patent: Jun. 3, 2008

(54) WATER RESISTANT MULTI-PANEL DOOR

(76) Inventor: Dustin Jake Wilds, 822 Caney Hollow Rd., Newport, TN (US) 37821

(*) Notice: Subject to any disclaimer, the term of this patent is extended or adjusted under 35 U.S.C. 154(b) by 362 days.

(21) Appl. No.: 11/322,028

(22) Filed: Dec. 29, 2005

(65) Prior Publication Data

US 2007/0152472 A1    Jul. 5, 2007

(51) Int. Cl.
*B60P 3/20* (2006.01)
(52) U.S. Cl. ............... 296/39.1; 160/40; 160/230; 296/146.1; 296/146.8; 296/146.9
(58) Field of Classification Search .............. 296/39.1, 296/39.3, 24.41, 176.3, 155, 146.1, 50, 147, 296/146.7, 146.8, 146.9; 160/40, 230
See application file for complete search history.

(56) References Cited

U.S. PATENT DOCUMENTS 3,302,690 A * 2/1967 Hurd ........................... 160/40
6,802,551 B2   10/2004 Nelson

* cited by examiner

*Primary Examiner*—Joseph D Pape
(74) *Attorney, Agent, or Firm*—Raymond M. Galasso; Galasso & Associates, LP; David O. Simmons

(57) ABSTRACT

A multi-panel door comprises a plurality of side-by-side door panels and a water-resistant shield. Each one of the door panels is pivotably attached at an edge thereof to an adjacent one of the door panels thereby defining an edge interface between the adjacent ones of the door panels. Each one of the door panels has a cargo space facing major surface and an exterior facing major surface generally opposite and spaced apart from the cargo space facing major surface. The water-resistant shield extends over at least a portion of the cargo space facing major surface of all of the door panels. The water-resistant shield covers each edge interface defined by the door panels and wraps at least partially around a bottom longitudinal edge of a lower-most one of the door panels.

19 Claims, 2 Drawing Sheets

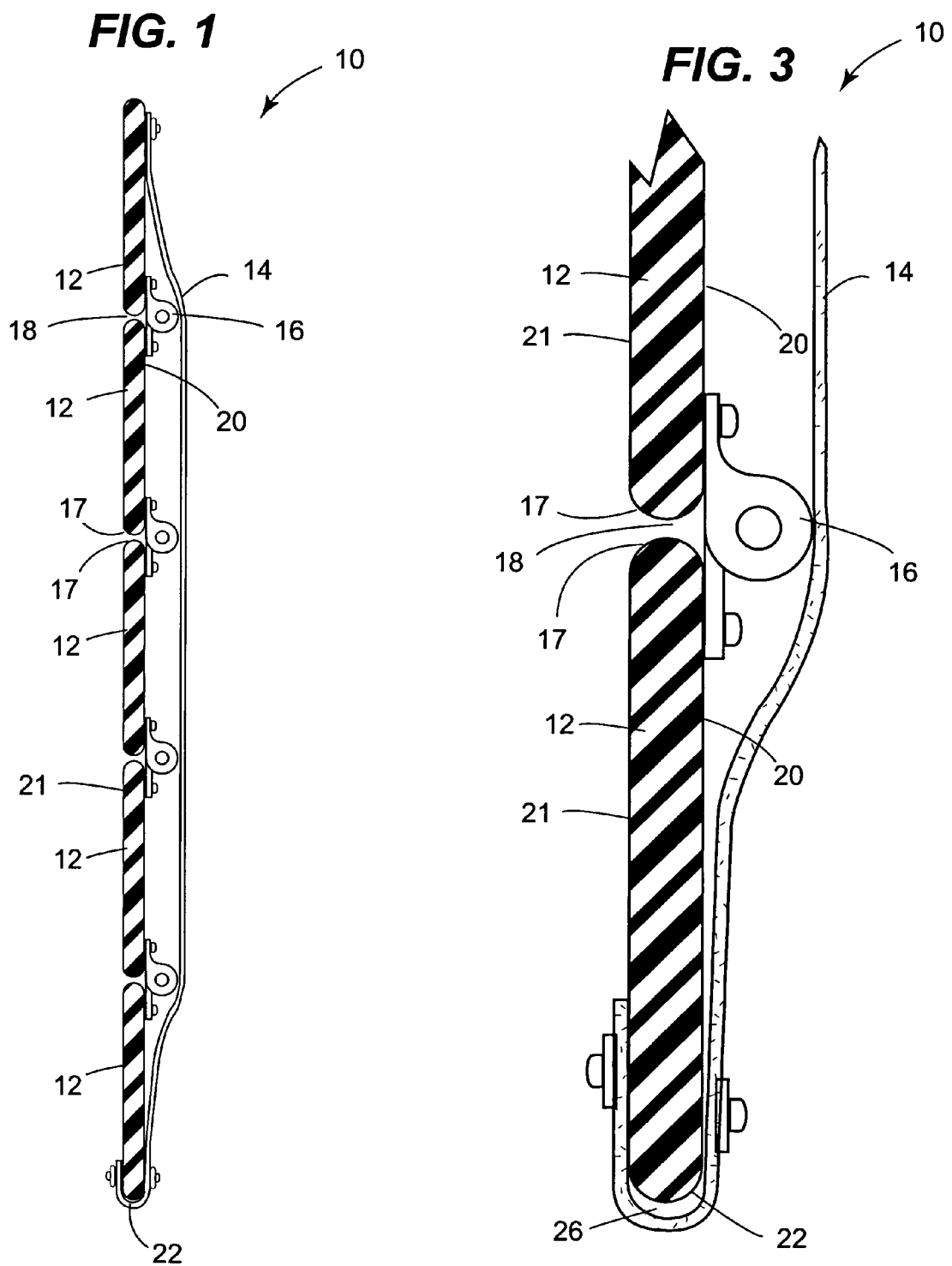

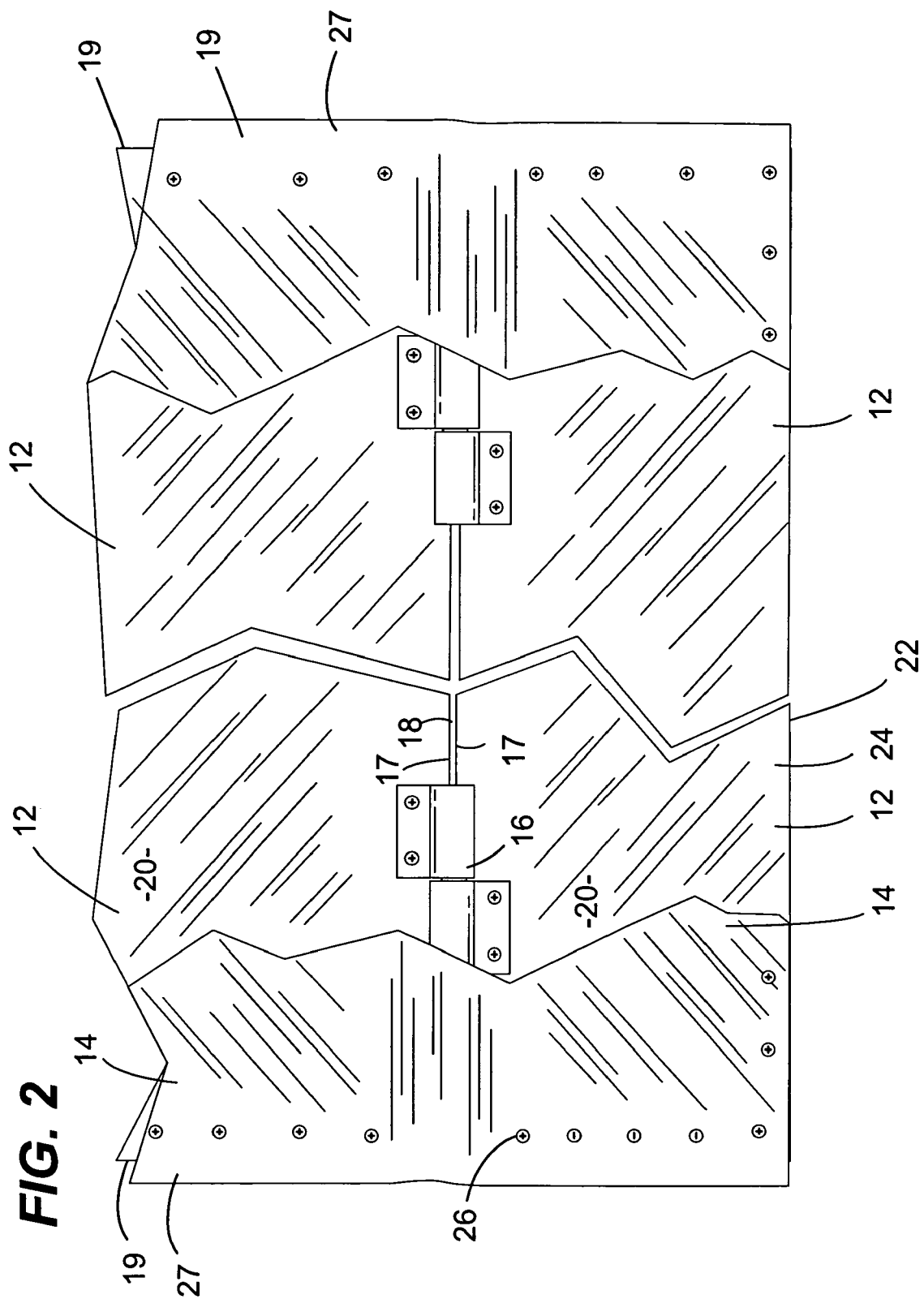

WATER RESISTANT MULTI-PANEL DOOR

FIELD OF THE DISCLOSURE

The disclosures made herein relate generally to truck trailer doors and, more particularly, to water resistant truck trailer doors can storage unit doors.

BACKGROUND

It is well know that cargo within enclosed truck trailers (i.e., truck trailers) is often damaged by water from rain, snow and ice (i.e., water damage). Whether the truck trailer is that of a company that owns the cargo or the truck trailer is owned by a trucking company hired to haul the cargo, there are financial incentives for reducing the potential for water damage to such cargo. For example, under certain circumstances, a trucking company assume the liability for cargo damaged while in their possession. More specifically, a trucking company typically holds liability for cargo within truck trailers owned by the trucking company or otherwise under control and/or hire by the trucking company. Accordingly, during transport, trucking companies and cargo owners transporting their own cargo each have a vested interest in protecting cargo from adverse situations such as theft, damage from handling and damage from the elements.

The typical truck trailer is not impervious to water, whether the water is in the form of rain, snow or ice or from a source such as a sprinkler system or truck wash. As a result, cargo is often subjected to water damage during transport within a truck trailer. The doors of a truck trailer, particularly multi-panel doors (e.g., roll-up type doors, push-up doors, etc.), are susceptible to water intrusion. Water often makes it's way through seams between the discrete panels of a multi-panel type door of a truck trailer. Once in the trailer, the water can damage cargo within the truck trailer as it gathers on the floor, flows within the truck trailer and/or impinges directly upon cargo adjacent the multi-panel door of a truck trailer.

Therefore, a multi-segment door of a truck trailer that is configured for reducing, if not eliminating water from entering a cargo space of the truck trailer through the door would be useful and advantageous.

SUMMARY OF THE DISCLOSURE

Embodiments of the present invention are particularly useful for protecting cargo within a truck trailer from damage by water that enters the truck trailer through a multi-panel door. While embodiments of the present invention are particularly useful for protecting cargo within a truck trailer from damage by water that enters the truck trailer through a multi-panel door, they are also useful in other applications such as storage unit doors, residential garage doors and the like. Embodiments of the present invention reduce, if not eliminating, water from entering a cargo space through a multi-panel door. In doing so, embodiments of the present invention advantageously overcome one or more shortcomings associated with conventional non-shielded multi-panel doors.

In one embodiment of the present invention, a multi-panel door comprises a plurality of side-by-side door panels and a water-resistant shield. Each one of the door panels is pivotably attached at an edge thereof to an adjacent one of the door panels thereby defining an edge interface between the adjacent ones of the door panels. Each one of the door panels has a cargo space facing major surface and an exterior facing major surface generally opposite and spaced apart from the cargo space facing major surface. The water-resistant shield extends over at least a portion of the, cargo space facing major surface of all of the door panels. The water-resistant shield covers each edge interface defined by the door panels and wraps at least partially around a bottom longitudinal edge of a lower-most one of the door panels.

In another embodiment of the present invention, a multi-panel door comprises a plurality of hinged door panels and a water-resistant shield. Adjacent ones of the door panels defining an edge interface therebetween. Each one of the door panels has a cargo space facing major surface and an exterior facing major surface generally opposite and spaced apart from the cargo space facing major surface. The water-resistant shield extends over at least a portion of the cargo space facing major surface of all of the door panels. The water-resistant shield covers each edge interface defined by the door panels and wraps fully around a bottom longitudinal edge of a lower-most one of the door panels.

In another embodiment of the present invention, a method comprises providing a multi-panel door including a plurality of hinged door panels. Adjacent ones of the door panels defining an edge interface therebetween and each one of the door panels has a cargo space facing major surface and an exterior facing major surface generally opposite and spaced apart from the cargo space facing major surface. An operation is performed for applying a water-resistant shield over at least a portion of the cargo space facing major surface of all of the door panels. The applying includes covering each edge interface defined by the door panels with the water-resistant shield. An operation is performed for wrapping the water-resistant shield fully around a bottom longitudinal edge of a lower-most one of the door panels.

Turning now to specific aspects of the present invention, in at least one embodiment, the water-resistant shield is secured to each one of the door panels adjacent opposed side edges of each one of the door panels.

In at least one embodiment of the present invention, the water-resistant shield wraps fully around a bottom longitudinal edge of a lower-most one of the door panels.

In at least one embodiment of the present invention, the water resistant shield is loosely wrapped around the bottom longitudinal edge of the lower-most one of the door panels for weep passage between the bottom longitudinal edge of the lower-most one of the door panels and the water-resistant shield.

In at least one embodiment of the present invention, the water-resistant shield is secured to the exterior facing major surface of the lower-most one of the door panels.

In at least one embodiment of the present invention, an operation is performed for securing the water-resistant shield to each one of the door panels adjacent opposed side edges of each one of the door panels.

In at least one embodiment of the present invention, wrapping the water-resistant shield fully around a bottom longitudinal edge of a lower-most one of the door panels includes wrapping the water-resistant shield loosely so as to provide a weep passage between the bottom longitudinal edge of the lower-most one of the door panels and the water-resistant shield.

In at least one embodiment of the present invention, an operation is performed for securing the water-resistant shield to the exterior facing major surface of the lower-most one of the door panels.

These and other objects, embodiments, advantages and/or distinctions of the present invention will become readily apparent upon further review of the following specification, associated drawings and appended claims.

BRIEF DESCRIPTION OF THE DRAWINGS

FIG. 1 is a cross-sectional side view of a multi-panel door in accordance with the present invention.

FIG. 2 is a fragmentary view of a cargo space facing side of the multi-panel door in FIG. 1.

FIG. 3 is an enlarged fragmentary, cross-sectional side view of the multi-panel door depicted in FIG. 1.

DETAILED DESCRIPTION OF THE DRAWING FIGURES

FIGS. 1-3 depict various aspects of a first embodiment of multi-panel door in accordance with present invention, which is referred to herein as the multi-panel door 10. The multi-panel door 10 includes a plurality of door panels 12 and a water-resistant shield 14. The door panels 12 are in a horizontal side-by-side orientation such that adjacent ones of the door panels 12 have spaced apart and substantially parallel longitudinal edges. Roll-up doors as used on a storage unit or a truck trailer are examples of the multi-panel door 10. Examples of the water-resistant shield 14 include a vinyl-coated tarp, a sheet of polymeric material (e.g., Tyvek offered by Dupont) or other material configured for limiting the transmission of water droplets therethrough. It is disclosed herein that the water-resistant shield 14 is not limited to a particular type of material or construction.

Each one of the door panels 12 is attached via a plurality of hinges 16 at a longitudinal edge 17 thereof to an adjacent one of the door panels 12 thereby defining an edge interface 18 between the adjacent ones of the door panels 12. Because the door panels 12 are spaced apart-the edge interface 18 is characterized by a gap between adjacent door panels 12. It is through this gap where water passes through the multi-panel door 10.

Each one of the door panels 12 has a cargo space facing major surface 20 (i.e., an interior surface of the multi-panel door 10 when in a mounted orientation) and an exterior facing major face 21 (i.e., an exterior surface of the multi-panel door 10 when in a mounted orientation). The cargo space facing major surface 20 of each one of the door panels 12 is spaced apart from and is generally opposite the exterior facing major face 21 of the respective one of the door panels 12. For example, each one of the door panels 12 may be a solid core door panel or an insulated core door panel.

The water-resistant shield 14 extends over substantially all the cargo space facing major surface 20 of each of the door panels 12. Optionally, the water-resistant shield 14 extends over only a portion of the cargo space facing major surface 20 of one or more of the door panels 12. The water-resistant shield 14 covers each edge interface 18 defined by the door panels and is secured to each one of the door panels adjacent opposed side edges 19 of each one of the door panels. The water-resistant shield 14 is secured by means such as screws, snaps, hook and loop fasteners or the like. By covering each edge interface 18, the water-resistant shield 14 at least partially blocks water that passes through one of the edge interfaces 18 from directly entering a cargo space protected by multi-panel door 10.

The water-resistant shield 14 wraps fully partially around a bottom longitudinal edge 22 of a lower-most one 24 of the door panels 12 and is secured to the exterior facing major surface 21 of the lower-most one 22 of the door panels 12. As best depicted in FIG. 1, the water-resistant shield 14 is relatively loosely wrapped around the bottom longitudinal edge 22 of the lower-most one 24 of the door panels 12 such that a weep passage 26 (FIG. 3) is provided between the bottom longitudinal edge 22 of the lower-most 24 one of the door panels 12 and the water-resistant shield 14. The weep passage 26 serves to provide a means for water that has passed through the edge interfaces 18 to be channeled to the opposed edges of the multi-panel door 10. In doing to, this water maybe directed away from the cargo space of a trailer or storage unit such as through drains provided in a floor of the trailer or storage unit near the opposed edges of the multi-panel door 10, thus providing for water channel functionality in accordance with the present invention.

The water-resistant shield 14 extends past the opposed side edges 19 of each one of the door panels 12. In this manner, a side flap portion 27 is provided. Each side flap portion 27 is configured (e.g., sized) such that it extends into contact or nearly into contact with an adjacent sidewall of a trailer on which the multi-panel door 10 is mounted. The side flat portion 27 serves to preclude or, at least limit, the amount of water that passes between the side edges 19 of the door panels 12 and the adjacent sidewall of the trailer.

The present invention includes a method for retrofitting an existing multi-panel door with a water-resistance shield to provide water channeling functionality as disclosed herein. In one embodiment of such a method, a multi-panel door including a plurality of hinged door panels is provided. Adjacent ones of the door panels define an edge interface therebetween. Each one of the door panels has a cargo space facing major surface and an exterior facing major surface generally opposite and spaced apart from the cargo space facing major surface. An operation is performed for applying a water-resistant shield over at least a portion of the cargo space facing major surface of all of the door panels. Applying the water-resistant shield includes covering each edge interface defined by the door panels with the water-resistant shield. An operation is performed for securing the water-resistant shield to each one of the door panels adjacent opposed side edges of each one of the door panels. An operation is performed for wrapping the water-resistant shield fully around a bottom longitudinal edge of a lower-most one of the door panels. Wrapping the water-resistant shield fully around a bottom longitudinal edge of the lower-most one of the door panels includes wrapping the water-resistant shield loosely so as to provide a weep passage between the bottom longitudinal edge of the lower-most one of the door panels and the water-resistant shield. An operation-is performed for securing the water-resistant shield to the exterior facing major surface of the lower-most one of the door panels after wrapping the water-resistant shield fully around the bottom longitudinal edge of the lower-most one of the door panels.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A multi-panel door, comprising:
   a plurality of side-by-side door panels, wherein each one of said door panels is pivotably attached at an edge thereof to an adjacent one of said door panels thereby defining an edge interface between said adjacent ones of said door panels and wherein each one of said door panels has a cargo space facing major surface and an exterior facing major surface generally opposite and spaced apart from the cargo space facing major surface; and
   a water-resistant shield extending over at least a portion of the cargo space facing major surface of all of said door panels, wherein the water-resistant shield covers each edge interface defined by said door panels and wherein the water-resistant shield wraps at least partially around a bottom longitudinal edge of a lower-most one of said door panels.

2. The multi-panel door of claim 1 wherein the water-resistant shield is secured to each one of said door panels adjacent opposed side edges of each one of said door panels.

3. The multi-panel door of claim 1 wherein the water-resistant shield wraps fully around a bottom longitudinal edge of a lower-most one of said door panels.

4. The multi-panel door of claim 3 wherein a weep passage is provided between the bottom longitudinal edge of the lower-most one of said door panels and the water-resistant shield.

5. The multi-panel door of claim 3 wherein the water-resistant shield is secured to the exterior facing major surface of the lower-most one of said door panels.

6. The multi-panel door of claim 5 wherein a weep passage is provided between the bottom longitudinal edge of the lower-most one of said door panels and the water-resistant shield.

7. The multi-panel door of claim 5 wherein the water-resistant shield is secured to each one of said door panels adjacent opposed side edges of each one of said door panels.

8. A multi-panel door, comprising:
   a plurality of hinged door panels, wherein adjacent ones of said door panels defining an edge interface therebetween and wherein each one of said door panels has a cargo space facing major surface and an exterior facing major surface generally opposite and spaced apart from the cargo space facing major surface; and
   a water-resistant shield extending over at least a portion of the cargo space facing major surface of all of said door panels, wherein the water-resistant shield covers each edge interface defined by said door panels and wherein the water-resistant shield wraps fully around a bottom longitudinal edge of a lower-most one of said door panels.

9. The multi-panel door of claim 8 wherein the water-resistant shield is secured to each one of said door panels adjacent opposed side edges of each one of said door panels.

10. The multi-panel door of claim 8 wherein a weep passage is provided between the bottom longitudinal edge of the lower-most one of said door panels and the water-resistant shield.

11. The multi-panel door of claim 8 wherein the water-resistant shield is secured to the exterior facing major surface of the lower-most one of said door panels.

12. The multi-panel door of claim 11 wherein the water-resistant shield is secured to each one of said door panels adjacent opposed side edges of each one of said door panels.

13. The multi-panel door of claim 12 wherein a weep passage is provided between the bottom longitudinal edge of the lower-most one of said door panels and the water-resistant shield.

14. A method, comprising:
   providing a multi-panel door including a plurality of hinged door panels, wherein adjacent ones of said door panels defining an edge interface therebetween and wherein each one of said door panels has a cargo space facing major surface and an exterior facing major surface generally opposite and spaced apart from the cargo space facing major surface; and
   applying a water-resistant shield over at least a portion of the cargo space facing major surface of all of said door panels, wherein said applying includes covering each edge interface defined by said door panels with the water-resistant shield; and
   wrapping the water-resistant shield fully around a bottom longitudinal edge of a lower-most one of said door panels.

15. The method of claim 14, further comprising:
   securing the water-resistant shield to each one of said door panels adjacent opposed side edges of each one of said door panels.

16. The method of claim 14 wherein wrapping the water-resistant shield fully around the bottom longitudinal edge of a lower-most one of said door panels includes wrapping the water-resistant shield loosely so as to provide a weep passage between the bottom longitudinal edge of the lower-most one of said door panels and the water-resistant shield.

17. The method of claim 14 further comprising:
   securing the water-resistant shield to the exterior facing major surface of the lower-most one of said door panels.

18. The method of claim 17 further comprising:
   securing the water-resistant shield to each one of said door panels adjacent opposed side edges of each one of said door panels.

19. The method of claim 18 wherein wrapping the water-resistant shield fully around the bottom longitudinal edge of a lower-most one of said door panels includes wrapping the water-resistant shield loosely so as to provide a weep passage between the bottom longitudinal edge of the lower-most one of said door panels and the water-resistant shield.

* * * * *